(12) United States Patent
Persad

(10) Patent No.: US 10,314,242 B2
(45) Date of Patent: Jun. 11, 2019

(54) PHENOLOGY-BASED PLANT CARE SYSTEM

(71) Applicant: The Davey Tree Expert Company, Kent, OH (US)

(72) Inventor: Anand Persad, Streetsboro, OH (US)

(*) Notice: Subject to any disclaimer, the term of this patent is extended or adjusted under 35 U.S.C. 154(b) by 207 days.

(21) Appl. No.: 15/305,078

(22) PCT Filed: Apr. 21, 2015

(86) PCT No.: PCT/US2015/026736
§ 371 (c)(1),
(2) Date: Oct. 18, 2016

(87) PCT Pub. No.: WO2015/161324
PCT Pub. Date: Oct. 22, 2015

(65) Prior Publication Data
US 2017/0042097 A1 Feb. 16, 2017

Related U.S. Application Data

(60) Provisional application No. 61/981,439, filed on Apr. 18, 2014.

(51) Int. Cl.
*G06F 11/30* (2006.01)
*A01G 7/00* (2006.01)
(Continued)

(52) U.S. Cl.
CPC .............. *A01G 7/00* (2013.01); *G06Q 10/06* (2013.01); *G06Q 10/0631* (2013.01);
(Continued)

(58) Field of Classification Search
CPC ........................................ A01G 7/00
See application file for complete search history.

(56) References Cited

U.S. PATENT DOCUMENTS 7,031,927 B1 4/2006 Beck et al.
7,184,891 B1 * 2/2007 Kuleszynski ........... G01W 1/10
702/3
(Continued)

FOREIGN PATENT DOCUMENTS

WO 2011084471 A1 7/2011

OTHER PUBLICATIONS

International Searching Authority, International Search Report and Written Opinion issued in International Application No. PCT/US15/26736 dated Jul. 28, 2015.
(Continued)

*Primary Examiner* — Phuong Huynh
(74) *Attorney, Agent, or Firm* — Thompson Hine LLP

(57) ABSTRACT

A computer-implemented method comprises the steps of using a processor to calculate, for a current calendar date, an initial growing degree day (GDD) warmth value based at least in part upon a past GDD warmth value for a calendar date in a previous year corresponding to the current calendar date; calculate a present GDD warmth value; calculate a deviation value from at least the initial GDD warmth value and the present GDD warmth value; calculate for a future calendar date a future growing degree day (GDD) warmth value based at least in part upon a past GDD warmth value for a calendar date in a previous year corresponding to the future calendar date; and determine a predicted GDD warmth value for the future calendar date by applying the deviation value to the future GDD warmth value. An apparatus to perform the method is also disclosed.

19 Claims, 7 Drawing Sheets

(51) Int. Cl.
*G06Q 50/02* (2012.01)
*G06Q 10/06* (2012.01)

(52) U.S. Cl.
CPC . *G06Q 10/06312* (2013.01); *G06Q 10/06314* (2013.01); *G06Q 50/02* (2013.01)

(56) References Cited

U.S. PATENT DOCUMENTS

| | | | |
|---|---|---|---|
| 8,340,910 B1 | 12/2012 | Magro et al. | |
| 2004/0080508 A1* | 4/2004 | Black | A01B 79/005 345/440 |
| 2006/0074560 A1 | 4/2006 | Dyer et al. | |

OTHER PUBLICATIONS

Venturelli, P et al., "Consistent patterns of maturity and density-dependent growth among populations of walleye (*Sander vitreus*): application of the growing degree-day metric", IEEE Transactions on Computing, vol. 58, No. 10;, (Jun. 11, 2010), pp. 1057-1067.

* cited by examiner

PHENOLOGY-BASED PLANT CARE SYSTEM

RELATED APPLICATION

This application claims priority to, and the full benefit of, U.S. Provisional Patent Application Ser. No. 61/981,439 filed on Apr. 17, 2014 and titled NATURE CLOCK.

TECHNOLOGICAL FIELD

This application relates generally to the field of plant health care and more particularly to the field of phenology-based systems for caring for plants.

SUMMARY

A computer-implemented method can comprise the steps of calculating, on a processor and for a current calendar date, an initial growing degree day (GDD) warmth value that is based at least in part upon a past GDD warmth value for a calendar date in a previous year that corresponds to the current calendar date; calculating, on a processor, a present GDD warmth value; calculating, on a processor, a deviation value from at least the initial GDD warmth value and the present GDD warmth value; calculating, on a processor and for a future calendar date, a future GDD warmth value that is based at least in part upon a past GDD warmth value for a calendar date in a previous year that corresponds to the future calendar date; and determining, on a processor, a predicted GDD warmth value for the future calendar date by applying the deviation value to the future GDD warmth value. The computer-implemented method can further comprise the step of creating, by using a processor, a set of two or more predicted GDD warmth values, each of which corresponds to a single future calendar date. Still further, the computer-implemented method can comprise the step of generating, by using a processor, a treatment plan based at least in part upon the set of two or more predicted GDD warmth values and an adjustment value.

The treatment plan can include a target date for a phase of treatment. The target date can be included in a date range. The adjustment value can be one of a growth stage factor and a floral set time. The step of generating a treatment plan can include selecting a treatment option that corresponds to the date range. The computer-implemented method can further comprise the step of updating one or more of the predicted GDD warmth values in the set of two or more predicted GDD warmth values.

A non-volatile computer-readable medium can comprise program instructions for causing a computer to perform a method that comprises the steps of calculating, for a current calendar date, an initial GDD warmth value that is based at least in part upon a past GDD warmth value for a calendar date in a previous year that corresponds to the current calendar date; calculating a present GDD warmth value; calculating a deviation value from at least the initial GDD warmth value and the present GDD warmth value; calculating, for a future calendar date, a future GDD warmth value that is based at least in part upon a past GDD warmth value for a calendar date in a previous year that corresponds to the future calendar date; and determining a predicted GDD warmth value for the future calendar date by applying the deviation value to the future GDD warmth value. The method can further comprise the step of creating a set of two or more predicted GDD warmth values, each of which corresponds to a single future calendar date. Still further, the method can comprise the step of generating a treatment plan based at least in part upon the set of two or more predicted GDD warmth values and an adjustment value.

The treatment plan can include a target date for a phase of treatment. The target date can be included in a date range. The adjustment value can be one of a growth stage factor and a floral set time. The step of generating a treatment plan can include selecting a treatment option that corresponds to the date range. Still further, the method can comprise the step of updating one or more of the predicted GDD warmth values in the set of two or more predicted GDD warmth values.

An apparatus can comprise a growing degree day (GDD) calculator configured to calculate an initial GDD warmth value that is based at least in part upon a past GDD warmth value for a calendar date in a previous year that corresponds to the current calendar date and obtained from an historical temperature data store, a present GDD warmth value obtained from a current temperature data store, a deviation value that is based at least in part upon the initial GDD warmth value and the present GDD warmth value, and for a future calendar date, a future GDD warmth value that is based at least in part upon a past GDD warmth value for a calendar date in a previous year that corresponds to the future calendar date; a phenology engine configured to correspond the future GDD warmth value with phenology information from a life cycle data store and a calendar module to create a life cycle prediction; and a plan generator configured to create a treatment plan by selecting a treatment from a treatment data store based at least in part upon the life cycle prediction. The GDD calculator can be further configured to update the future GDD warmth value. The plan generator can be further configured to update the treatment plan based at least in part upon an updated future GDD warmth value.

DETAILED DESCRIPTION

Figure 1:
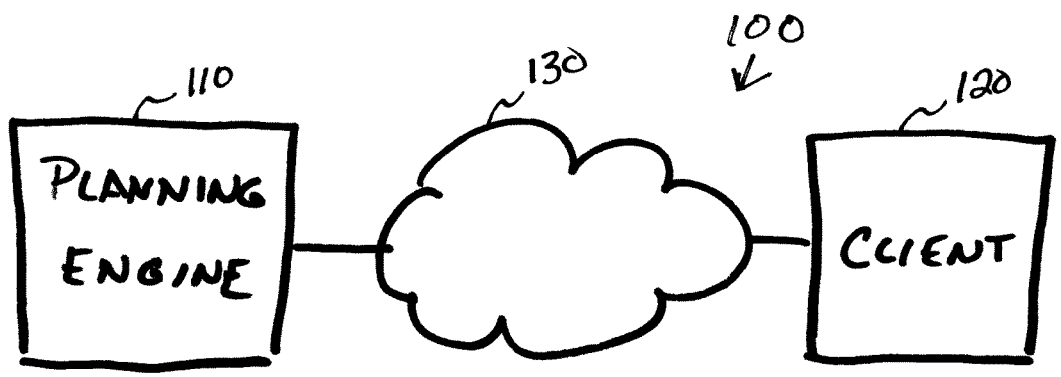
FIG. 1 is a system block diagram of a plant health care planning system.

The following detailed description will illustrate the general principles of the invention, examples of which are additionally illustrated in the accompanying drawings. In the drawings, like reference numbers indicate identical or functionally similar elements. It should be noted that for clarity, brevity, and ease of reading, not every combination or subcombination of components or steps is shown or described. It will be apparent from reading this document that various other combinations, subcombinations, and modifications can be made to what is disclosed and described below without departing from the general principles of the systems and methods disclosed and described here.

FIG. 1 is a system block diagram of a plant health care planning system 100. The planning system 100 can include a planning engine 110 for generating plant health care plans based on phonological data and observed temperatures. A client 120 can communicate with the planning engine 110 over network 130. The client 120 can be a dedicated software application running on a mobile computing device such as a smartphone or tablet, or it can be a web interface displayed using a web browser running on a mobile computing device, a laptop computer, or a desktop computer. Additionally or alternatively, any suitable human-computer interface can be used depending upon particular requirements in a given implementation.

Figure 2:
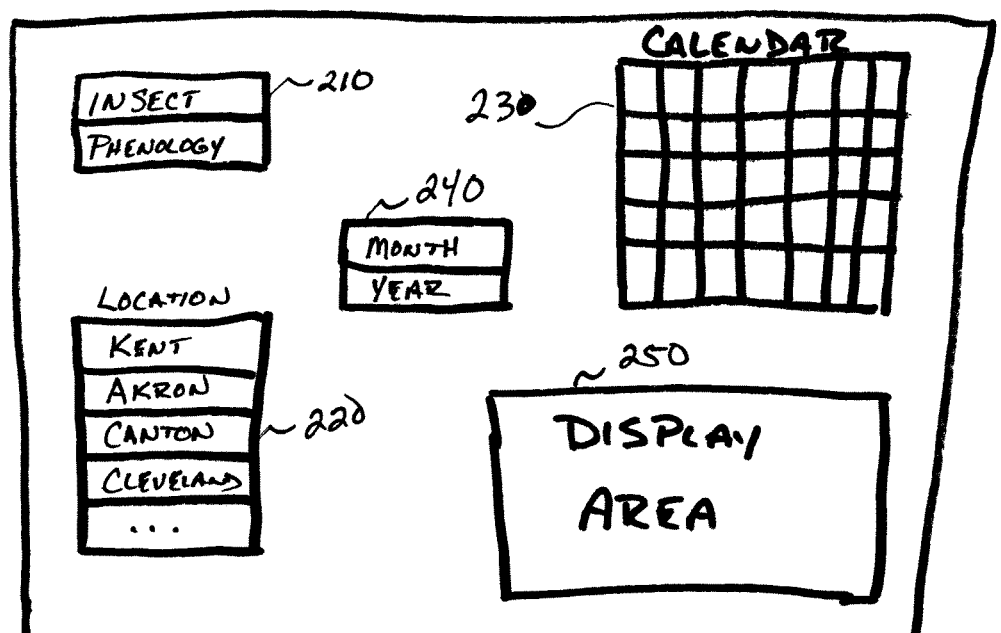
FIG. 2 is a plan view of a client user interface.

FIG. 2 is a plan view of a client-side user interface 200. In this example, the client-side user interface 200 is shown as a graphical user interface, although other suitable types of interfaces, including text-based interfaces, Braille interfaces, and audio interfaces, among others, can be used as the client-side user interface 200. As shown, the client-side user interface 200 can include a category selection menu 210 that can enable a user to select between an operational mode related to insects and an operational mode related to phenology of plants.

A location menu 220 can enable a user to manually select a geographic region. As will become apparent from reading this disclosure, geographic location can greatly affect creation of a treatment plan because of regional weather differences and even differences attributable to microclimates within a region. Additionally or alternatively, location information can be automatically obtained or changed by using global positional system location information from a device upon which the client-side user interface 200 is running and also through the use of geofencing techniques.

A calendar 230 can permit a user to enter a desired calendar date. A duration menu 240 can permit selection of a duration of time or range of dates for which the user desires to obtain information created by the planning system 100 of FIG. 1. A display area 250 permits a user to view information from the planning system 100 of FIG. 1, such as a treatment plan or phenological data of plants, among others. It should be noted that particulars of displays shown in this example can be, and likely will be, changed according to particular features supported by a specific user interface chosen as the client-side user interface 200 in any particular implementation.

Figure 3:
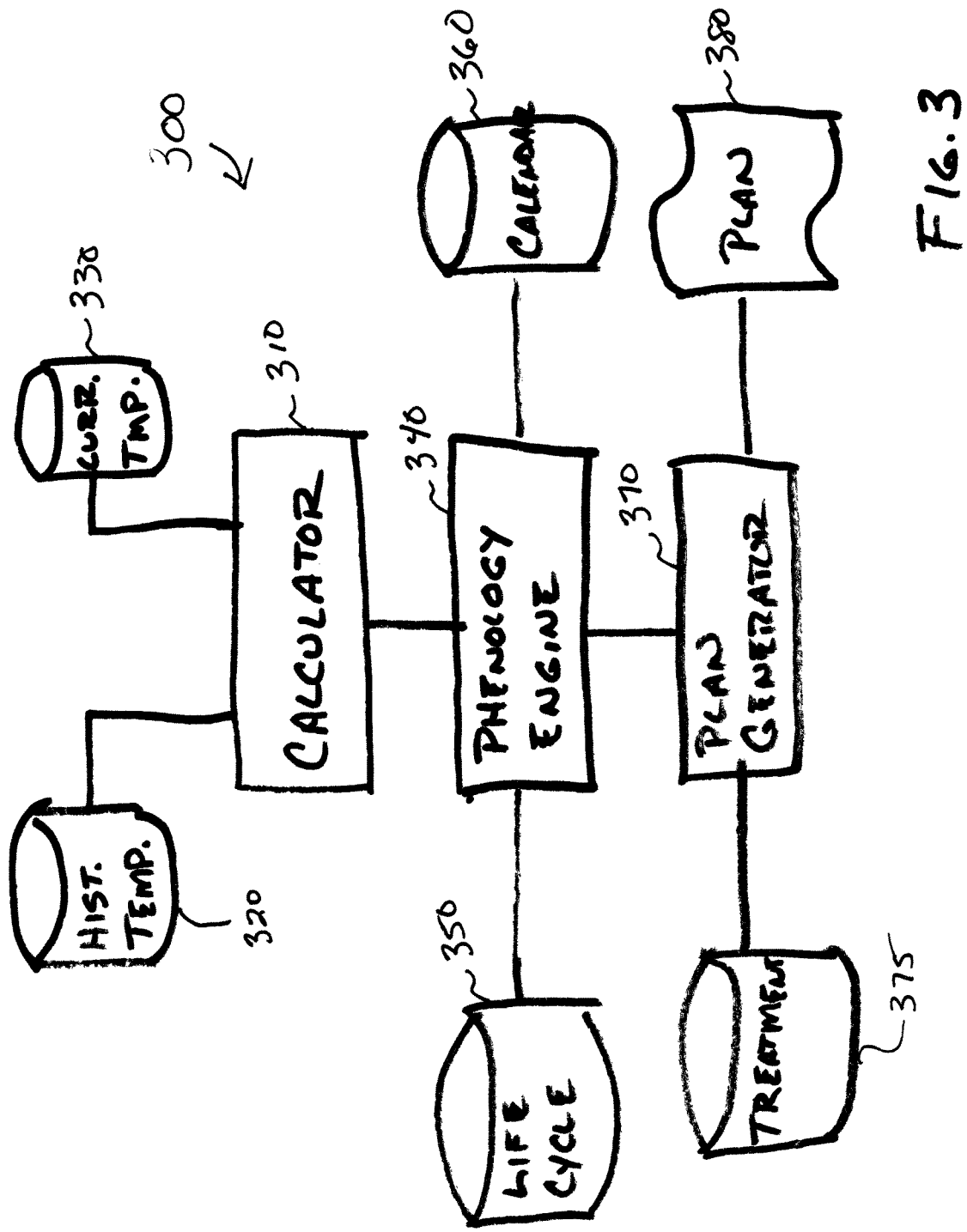
FIG. 3 is a system block diagram of a phenology engine.

FIG. 3 is a system block diagram of a phenology engine 300. The phenology engine 300 can include a calculator 310. The calculator 310 can access information from an historical temperature data store 320 and a current temperature data store 330. The calculator 310 can use information from the historical temperature data store 320 and the current temperature data store 330 to create a set of predicted warmth values by using growing degree day (GDD)-based calculations and information.

A phenology engine 340 can use predicted warmth values from the calculator 310 along with life cycle information from a life cycle data store 350 and calendar information from a calendar data store 360. The life cycle data store 350 can store information related to life cycles of a variety of plants and insects. This information can be created through observation of life cycles of various plants and insects of interest.

The phenology engine 340 can correlate warmth information from the calculator 310 with life cycle information from the life cycle data store 350 and calendar information from the calendar data store 360 to determine a specific life cycle-related event for a specific plant or insect of interest. Depending upon implementation, such correlation can be performed based upon matching key values with desired chosen values. For example, with plants, the life-cycle related event to be determined can be releases of pollen that can be used to predict high pollen count days for allergy sufferers, peak times for flower blooms, optimal fertilization or pollination times for crops and ornamental plants, seed germination times, and times for pruning and healing, among others. For insect pests, the life cycle-related event can be hatching from an egg, emergence from dormancy, and mating, among others.

A plan generator 370 can use correlated information from the phenology engine 340 along with treatment information from a treatment data store 375 to create a treatment plan 380. The treatment plan can provide a schedule for caring for plants of interest based on predicted conditions for a specified calendar date or range of dates. For example, for a lilac bush, a treatment plan can, for each one of a specified care activity, provide a monitoring period during which conditions should be monitored, a treatment period during which treatment is expected to be effective, and an extended treatment period during which additional benefits of extended care activities are expected to be realized. Care activities can include feeding and pruning of plants. With respect to insect pests, treatments can be targeted to be delivered at points in the insect's life cycle during which the insect is vulnerable to such treatment. Such targeted pest treatment can deliver treatments when expected to be most effective and additionally can provide guidance for the termination of treatment to manage undesired side effects of treatment such as unwanted effects on other plants or living things. A treatment plan can include instructions as to when to apply certain chemicals, how those chemicals are to be applied, in what concentrations to be applied, and dates upon which treatment should occur.

Figure 4:
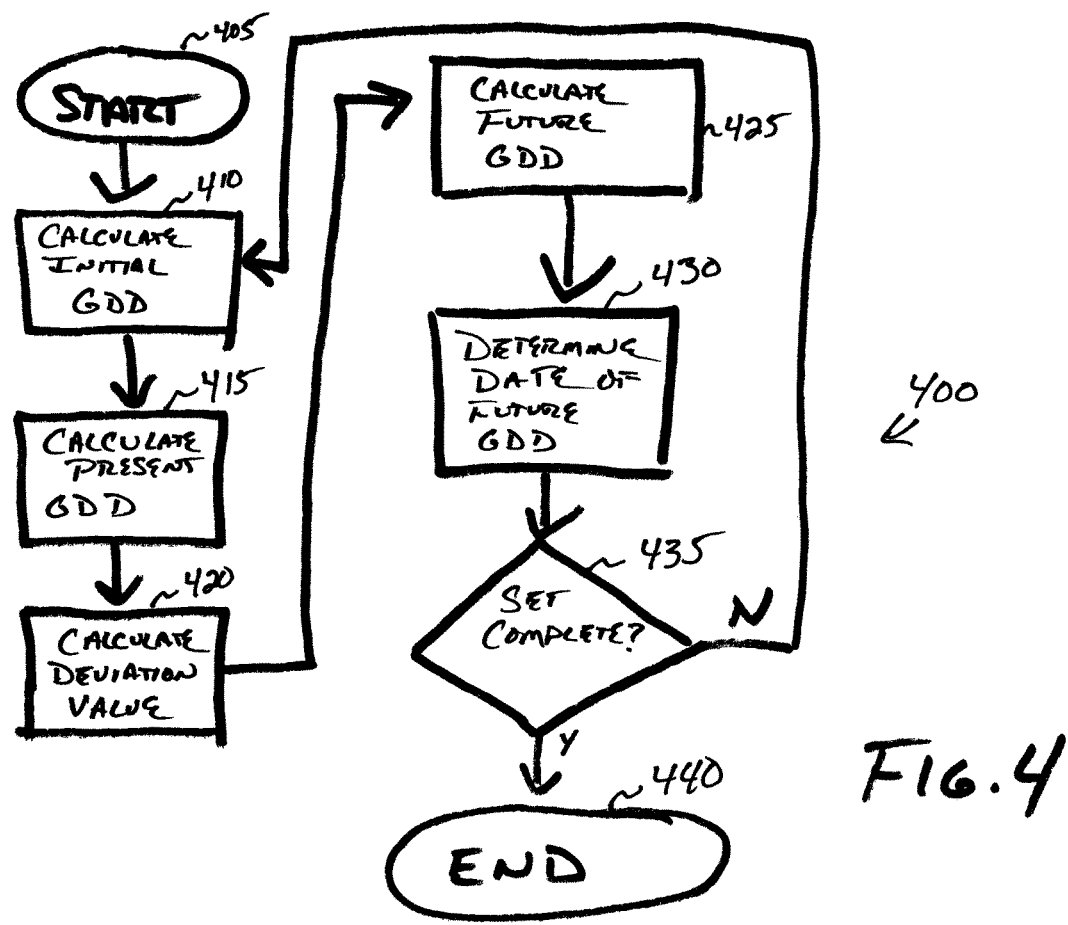
FIG. 4 is a flow diagram of a method for calculating warmth values.

FIG. 4 is a flow diagram of a method 400 for calculating warmth values. The method 400 can begin execution at START block 405 and continue to process block 410 where an initial GDD value is calculated. This initial GDD value can be calculated as an average value (mathematical mean) of GDD values for a corresponding month and day for three previous years. Prior historical GDD values can be obtained from a variety of sources, including the National Oceanographic and Atmospheric Administration (NOAA). As desired or required in a particular implementation, a different number of years can be used. Additionally or alternatively, an initial value can be obtained by using a weighted average, typically with heavier weighting in more recent years.

Processing continues to process block 415 where a present GDD value is calculated. This present GDD value can be obtained using the following formula:

$$\text{Max. Temp}(°\text{ F.}) + \text{Min Temp}(°\text{ F.}) - \text{Insect Base Temp} (50°\text{ F.}) = \text{GDD} \qquad 2$$

TABLE 1

| | Column | | | | |
| --- | --- | --- | --- | --- | --- |
| Date | 1<br>Max<br>Temp F.° | 2<br>Min<br>Temp F.° | 3<br>Average<br>Temp F.° | 4<br>−50° F. Base<br>Temp =<br>GDD/day | 5<br>Aggregate<br>GDD |
| March 1 | 28 | 12 | 20 | 0 | 0 |
| March 2 | 42 | 39 | 40.5 | 0 | 0 |

TABLE 1-continued

| Date | Column 1 Max Temp F.° | 2 Min Temp F.° | 3 Average Temp F.° | 4 −50° F. Base Temp = GDD/day | 5 Aggregate GDD |
|---|---|---|---|---|---|
| March 3 | 58 | 52 | 55 | 5 | 5 |
| March 4 | 60 | 50 | 55 | 5 | 10 |
| March 5 | 64 | 50 | 57 | 7 | 17 |
| March 6 | 65 | 45 | 55 | 5 | 22 |
| March 7 | 70 | 50 | ? | ? | ? |

At process block 420 a deviation value is calculated by subtracting the initial GDD value from the present GDD value. At process block 425, a future GDD value is calculated for a specific date. The date upon which that GDD value is expected to be reached or exceeded is determined at process block 430. At decision block 435 a determination is made whether a set of predicted GDD values has been completely created. Typically a set can include values for an entire calendar year. If NO, processing returns to process block 410 for a new date. If YES, processing terminates at END block 440.

Figure 5:
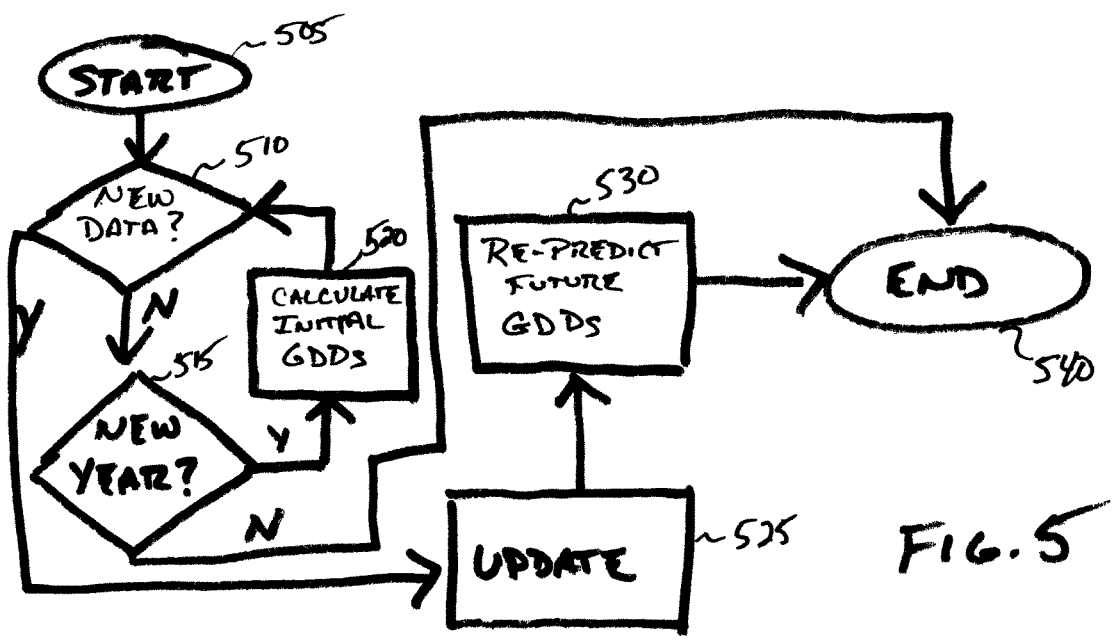
FIG. 5 is a flow diagram of a method for updating warmth values.

FIG. 5 is a flow diagram of a method 500 for updating warmth values. Processing begins at START block 505 and proceeds to process block 510 where a determination is made whether new present GDD data is available for the present day. If NO, processing continues to decision block 515 where a determination is made whether a new year's worth of predictions is needed. If YES, initial GDD values are calculated at process block 520 and processing returns to decision block 510.

If the determination made at decision block 510 is YES, processing continues at process block 525 where present GDD values are updated. Processing continues to process block 530 where predicted GDD values for future dates are adjusted according based on results of processing the new GDD data. Processing concludes at END block 540. Similarly, processing concludes at END block 540 if the determination made at decision block 515 is NO.

Figure 6:
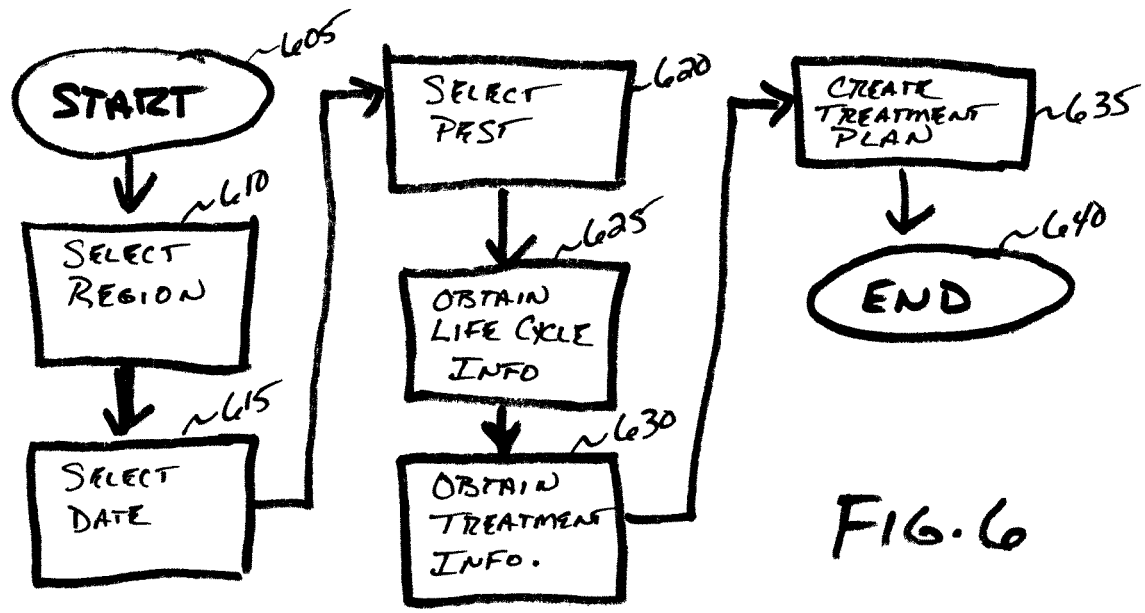
FIG. 6 is a flow diagram of a method for creating a pest treatment plan.

FIG. 6 is a flow diagram of a method 600 for creating a pest treatment plan. Processing begins at START block 605 and continues to process block 610 where a region is selected. Processing continues at process block 615 where a date is selected and then continues to process block 620 where a pest insect is selected. At process block 625 life cycle information for the selected pest is obtained and at process block 630 treatment information for the pest is obtained. Processing continues to process block 635 where a treatment plan is created. Processing of the method terminates at END block 640.

Figure 7:
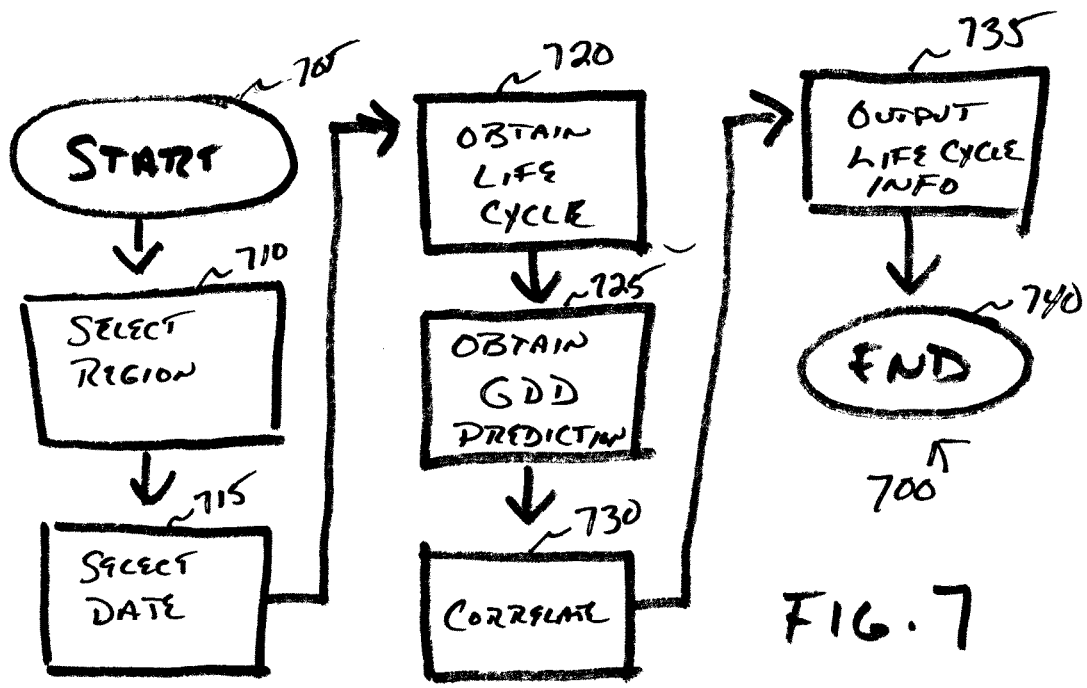
FIG. 7 is a flow diagram of a method for predicting plant life cycle events.

FIG. 7 is a flow diagram of a method 700 for predicting plant life cycle events. Processing begins at START block 705 and continues to process block 710 where a region is selected. Processing continues at process block 715 where a date is selected and then continues to process block 720 where a life cycle for a specified plant selected. At process block 725 GDD information for the selected plant is obtained and at process block 730 information for the plant is correlated. Processing continues to process block 735 where life cycle information for the plant is output. Processing of the method terminates at END block 740.

Figure 8A:
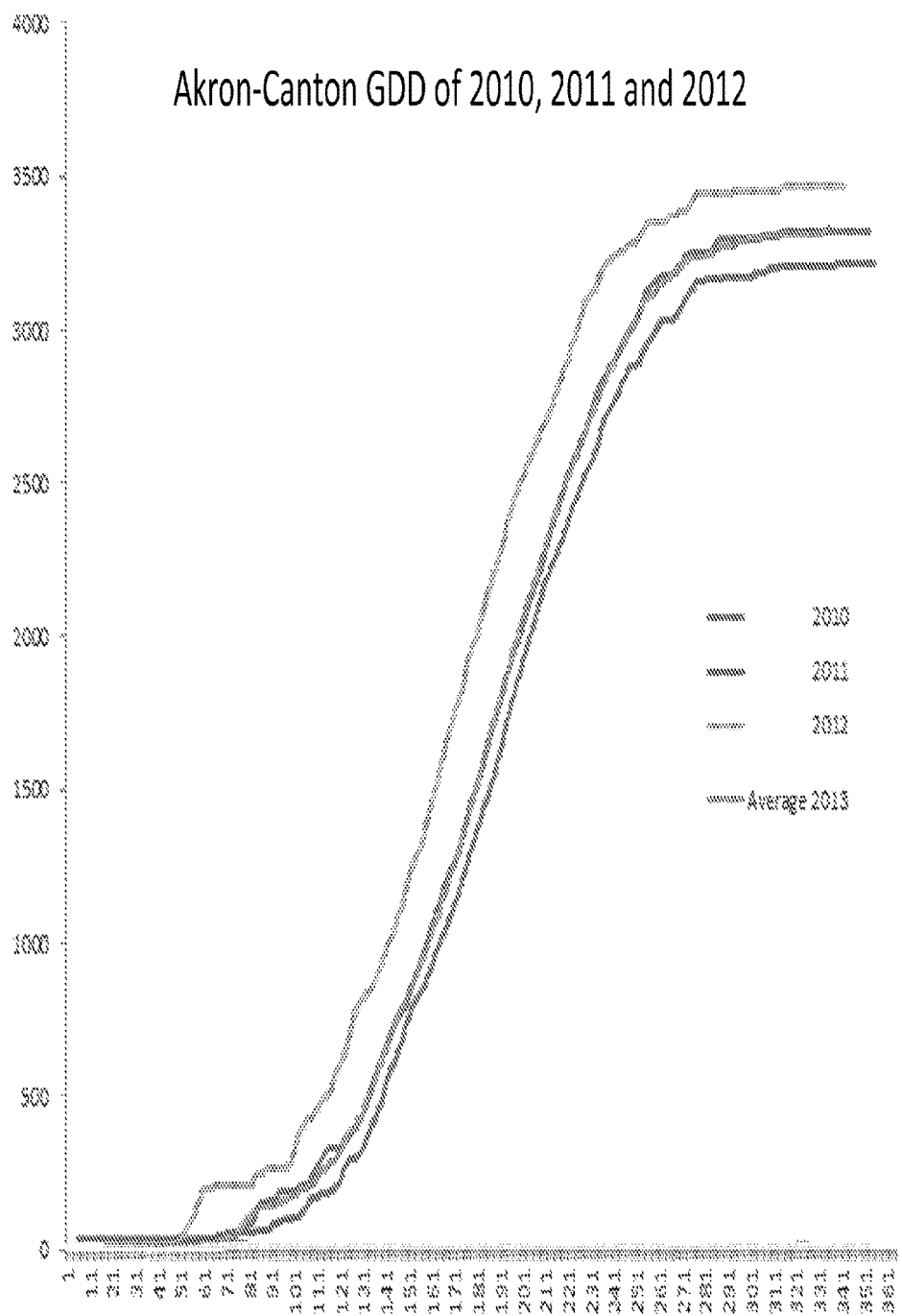
FIGS. 8A and 8B are plan views of prediction curves.
Figure 8B:
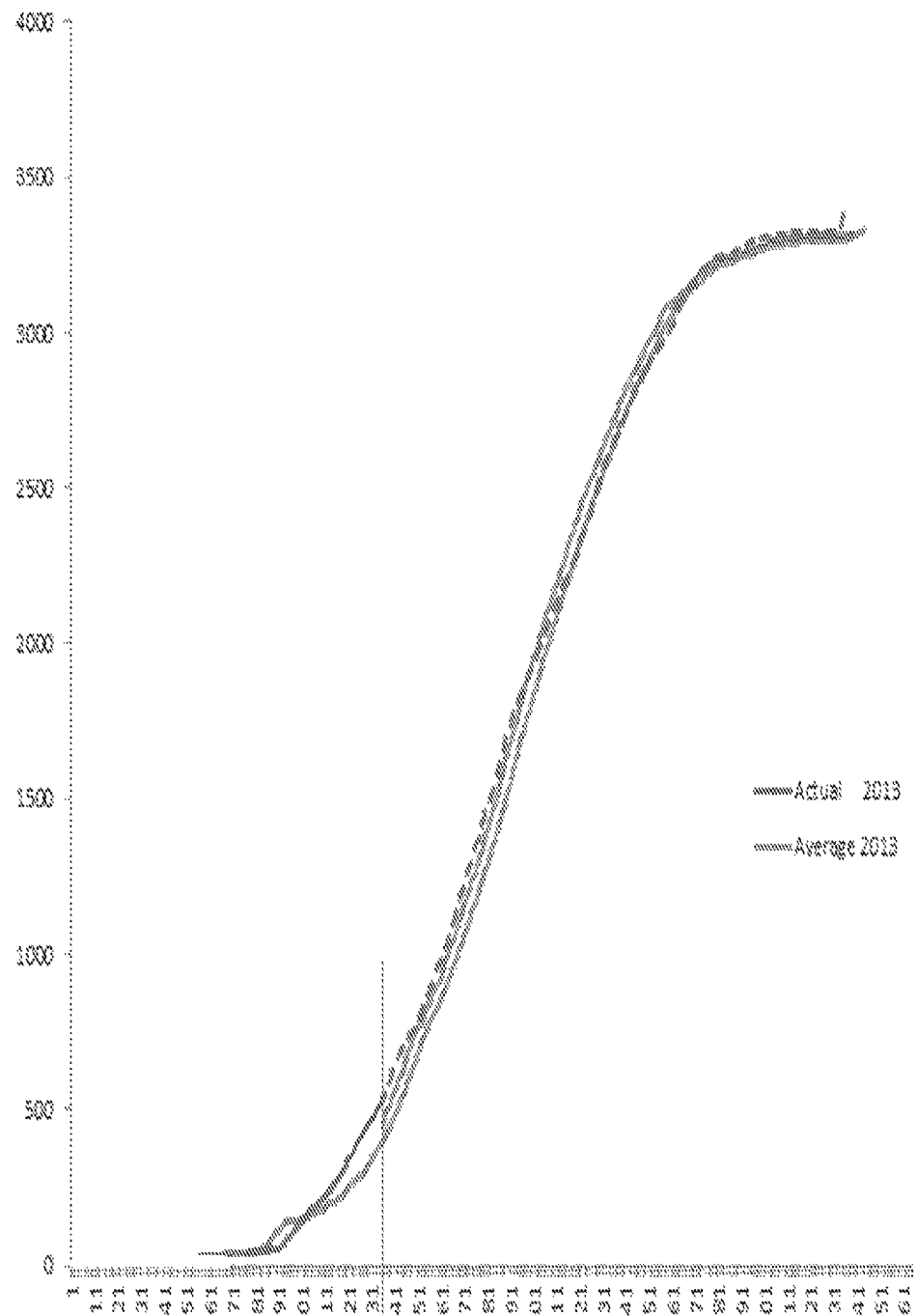

FIGS. 8A and 8B are plan views of prediction curves. FIG. 8A shows results of calculation of a prediction curve based on calculating historical GDD values as an arithmetic mean of 3 previous years. FIG. 8B shows correlation between the predicted values and measured values for that year.

Figure 9:
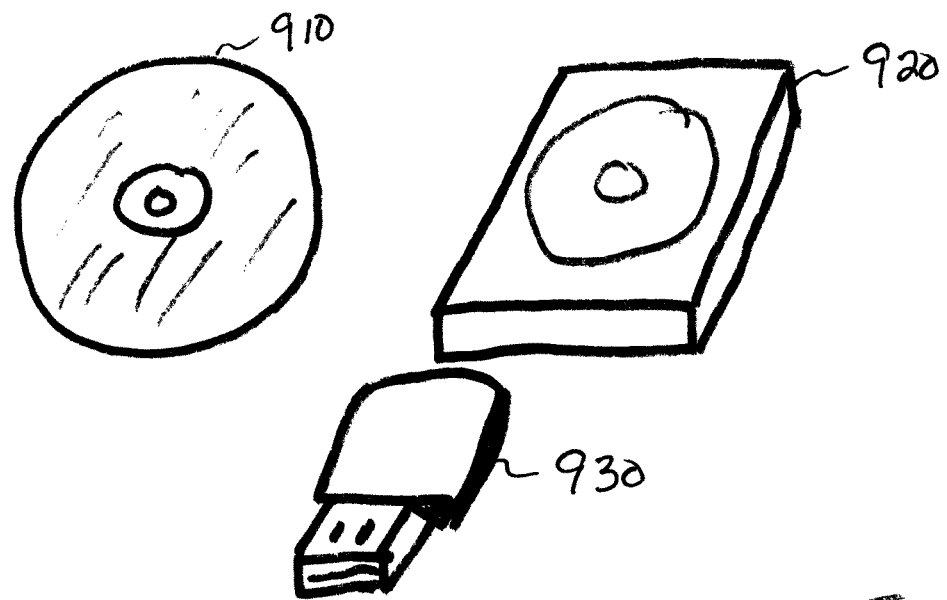
FIG. 9 is a perspective view of various computer-readable media.

FIG. 9 is a perspective view of various computer-readable media. Program information for a computer-executable program to perform the methods discussed above can be stored and retrieved using an optical disk 910, a hard disk drive 920, or a flash drive 930.

Figure 10:
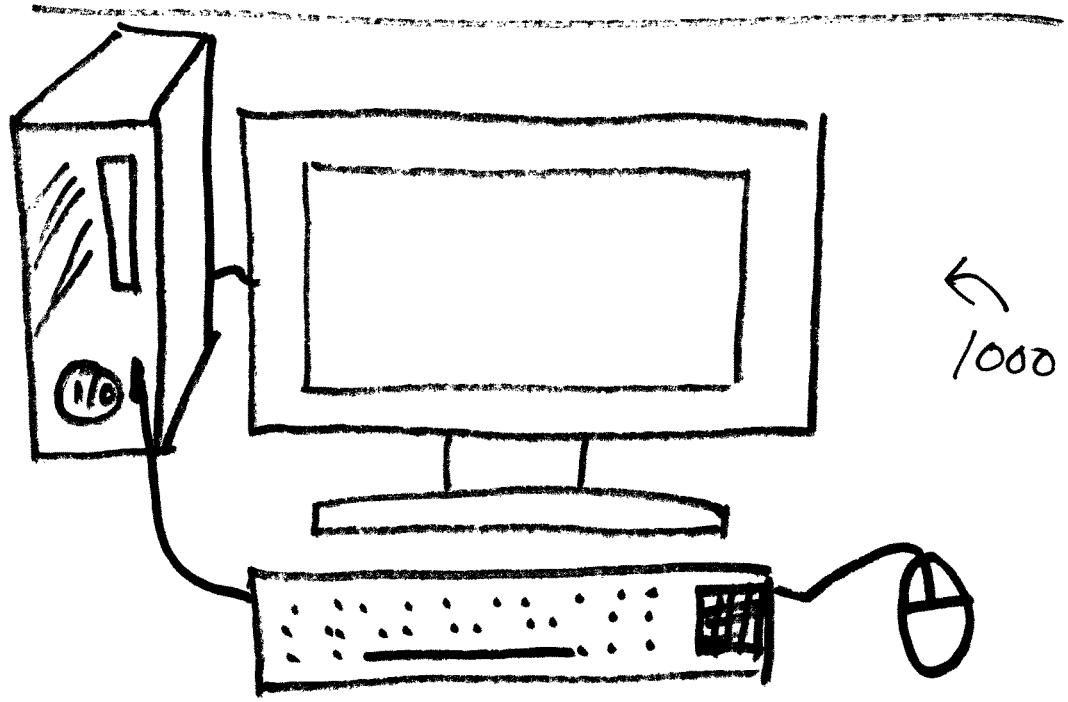
FIG. 10 is a perspective view of a computer.

FIG. 10 is a perspective view of a computer 1000. The computer 1000 can include a processing unit, non-volatile memory, volatile temporary storage, and various peripheral input/output devices. The computer 1000 can be used as a back-end server or as a client.

The examples of the apparatuses and methods shown in the drawings and described above are only some of numerous other examples that may be made within the scope of the appended claims. It is contemplated that numerous other configurations of the apparatuses and methods disclosed and described above can be created taking advantage of the disclosed approach. In short, it is the applicant's intention that the scope of the patent issuing from this application be limited only by the scope of the appended claims.

What is claimed is:

1. A method, comprising:
   calculating, on a processor and for a current calendar date, an initial growing degree day (GDD) warmth value that is based at least in part upon a past GDD warmth value for a calendar date in a previous year that corresponds to the current calendar date;
   calculating, on the processor, a present GDD warmth value;
   calculating, on the processor, a deviation value from at least the initial GDD warmth value and the present GDD warmth value;
   calculating, on the processor and for a future calendar date, a future GDD warmth value that is based at least in part upon a past GDD warmth value for a calendar date in a previous year that corresponds to the future calendar date;
   determining, on the processor, a predicted GDD warmth value for the future calendar date by applying the deviation value to the future GDD warmth value;
   generating, by using the processor, a treatment plan based at least in part on the predicted GDD warmth value for the future calendar date; and
   treating a plant according to the treatment plan.

2. The method of claim 1, further comprising:
   creating, by using the processor, a set of two or more predicted GDD warmth values, each of which corresponds to a single future calendar date.

3. The method of claim 2, further comprising:
   generating, by using the processor, the treatment plan based at least in part upon the set of two or more predicted GDD warmth values and an adjustment value.

4. The method of claim 3, wherein the treatment plan includes a target date for a phase of treatment.

5. The method of claim 4, wherein the target date is included in a date range.

6. The method of claim 5, wherein the adjustment value is one of a growth stage factor and a floral set time.

7. The method of claim 6, wherein generating a treatment plan includes:
   selecting a treatment option that corresponds to the date range.

8. The method of claim 7, further comprising:
  updating one or more of the predicted GDD warmth values in the set of two or more predicted GDD warmth values.

9. A non-transitory computer-readable medium comprising executable program instructions for causing a computer to perform a method comprising:
  calculating, for a current calendar date, an initial growing degree day (GDD) warmth value that is based at least in part upon a past GDD warmth value for a calendar date in a previous year that corresponds to the current calendar date;
  calculating a present GDD warmth value; calculating a deviation value from at least the initial GDD warmth value and the present GDD warmth value;
  calculating, for a future calendar date, a future GDD warmth value that is based at least in part upon a past GDD warmth value for a calendar date in a previous year that corresponds to the future calendar date;
  determining a predicted GDD warmth value for the future calendar date by applying the deviation value to the future GDD warmth value;
  generating a treatment plan based at least in part on the predicted GDD warmth value for the future calendar date; and
  instructing a user to treat a plant according to the treatment plan.

10. The non-transitory computer-readable medium of claim 9, wherein the method further comprises:
  creating a set of two or more predicted GDD warmth values, each of which corresponds to a single future calendar date.

11. The non-transitory computer-readable medium of claim 10, wherein the method further comprises:
  generating the treatment plan based at least in part upon the set of two or more predicted GDD warmth values and an adjustment value.

12. The non-transitory computer-readable medium of claim 11, wherein the treatment plan includes a target date for a phase of treatment.

13. The non-transitory computer-readable medium of claim 12, wherein the target date is included in a date range.

14. The non-transitory computer-readable medium of claim 13, wherein the adjustment value is one of a growth stage factor and a floral set time.

15. The non-transitory computer-readable medium of claim 14, wherein generating the treatment plan includes:
  selecting a treatment option that corresponds to the date range.

16. The non-volatile computer-readable medium of claim 15, wherein the method further comprises:
  updating one or more of the predicted GDD warmth values in the set of two or more predicted GDD warmth values.

17. An apparatus, comprising:
  a growing degree day (GDD) calculator configured to calculate an initial GDD warmth value that is based at least in part upon
    a past GDD warmth value for a calendar date in a previous year that corresponds to the current calendar date and obtained from an historical temperature data store,
    a present GDD warmth value obtained from a current temperature data store,
    a deviation value that is based at least in part upon the initial GDD warmth value and the present GDD warmth value, and
    for a future calendar date, a future GDD warmth value that is based at least in part upon a past GDD warmth value for a calendar date in a previous year that corresponds to the future calendar date;
  a phenology engine configured to correspond the future GDD warmth value with phenology information from a life cycle data store and a calendar module to create a life cycle prediction;
  a plan generator configured to create a treatment plan by selecting a treatment from a treatment data store based at least in part upon the life cycle prediction; and
  a display configured to show instructions for treating a plant according to the treatment plan.

18. The apparatus of claim 17, wherein the GDD calculator is further configured to update the future GDD warmth value.

19. The apparatus of claim 18, wherein the plan generator is further configured to update the treatment plan based at least in part upon an updated future GDD warmth value.

* * * * *